United States Patent [19]

Schabert et al.

[11] 3,929,568

[45] Dec. 30, 1975

[54] NUCLEAR POWER PLANT CONTAINMENT CONSTRUCTION

[75] Inventors: Hans-Peter Schabert; Rüdiger Danisch; Erich Strickroth, all of Erlangen, Germany

[73] Assignee: Siemens Aktiengesellschaft, Munich, Germany

[22] Filed: Sept. 6, 1973

[21] Appl. No.: 394,755

[30] Foreign Application Priority Data

Sept. 11, 1972 Germany............................ 2244563

[52] U.S. Cl...................................... 176/38; 176/87
[51] Int. Cl............................................... G21c 13/10
[58] Field of Search ..................... 176/37, 38, 32, 87

[56] References Cited
UNITED STATES PATENTS

| | | | |
|---|---|---|---|
| 2,841,545 | 7/1958 | Zinn................................... | 176/87 X |
| 3,022,238 | 2/1962 | Kolflat............................... | 176/87 X |
| 3,089,836 | 5/1963 | Wootton............................. | 176/32 |
| 3,234,102 | 2/1966 | Brown................................ | 176/87 X |
| 3,318,780 | 5/1967 | Bohmann et al.................... | 176/87 |
| 3,712,850 | 1/1973 | Campbell et al.................... | 176/37 |
| 3,713,968 | 1/1973 | Kennedy et al..................... | 176/37 |
| 3,793,145 | 2/1974 | Jordan et al........................ | 176/87 |

Primary Examiner—Robert F. Stahl
Attorney, Agent, or Firm—Kenyon & Kenyon Reilly Carr & Chapin

[57] ABSTRACT

The Nuclear Power Plant Containment Construction includes the spherical steel safety enclosure for the reactor and the equipment associated with the reactor and requiring this type of enclosure. This steel enclosure is externally structurally protected against accident by a concrete construction providing a foundation for the steel enclosure and having a cylindrical wall and a hemispherical dome, these parts being dimensioned to form an annular space surrounding the spherical steel enclosure, the latter and the concrete construction heretofore being concentrically arranged with respect to each other. In the disclosed construction the two parts are arranged with their vertical axis horizontally offset from each other so that opposite to the offsetting direction of the concrete construction a relatively large space is formed in the now assymetrical annular space in which reactor auxiliary equipment not requiring enclosure by the steel containment vessel or safety enclosure, may be located outside of the steel containment vessel and inside of the concrete construction where it is structurally protected by the latter.

7 Claims, 8 Drawing Figures

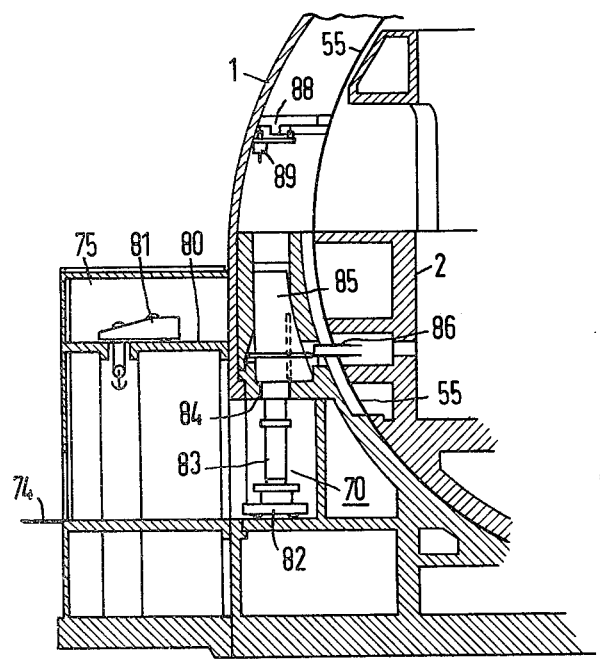
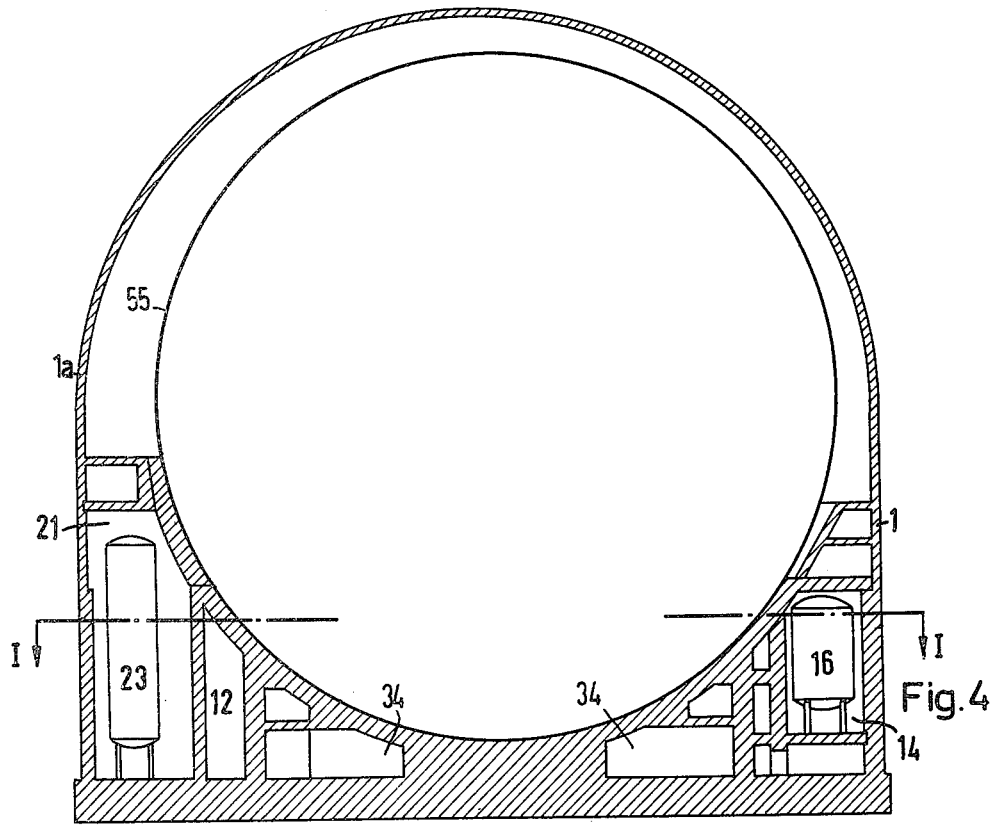
Fig. 3
Fig. 4

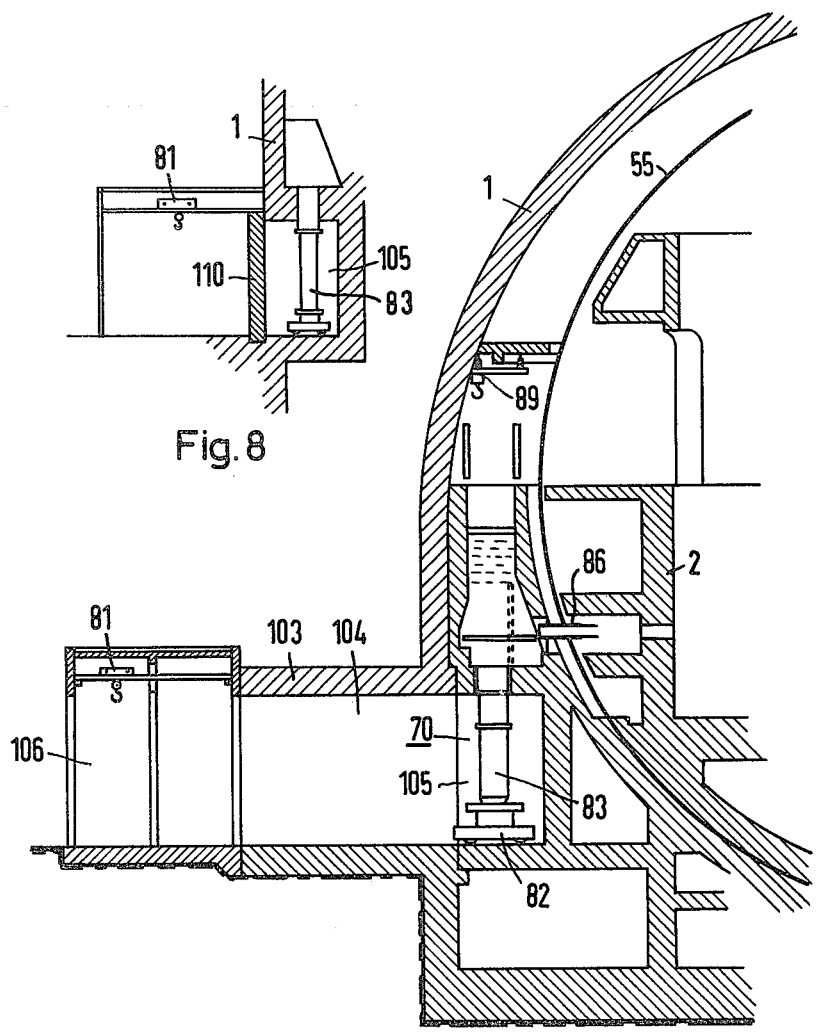

NUCLEAR POWER PLANT CONTAINMENT CONSTRUCTION

BACKGROUND OF THE INVENTION

A nuclear power plant containment construction includes a large spherical steel safety enclosure normally concentrically surrounded with some interspacing by a reinforced concrete shell having a cylindrical side wall and a hemispherical top enclosing the upper half of the spherical steel safety enclosure. Within the cylindrical wall this concrete construction provides a foundation for the steel safety enclosure.

The steel safety enclosure contains the possibly radioactive components of the nuclear power plant. In the case of a pressurized-water coolant reactor, for example, these components include the reactor pressure vessel, the steam generator or generators, pressurized water coolant pump or pumps, and the pipes which carry the coolant which may possibly be radioactive. The function of the steel containment vessel or safety enclosure is to intercept the coolant in the event of an accident, to prevent the possibility of radioactivity escaping to the environmental atmosphere.

The surrounding concrete shell which encloses the spherical steel safety enclosure, may provide some further protection for the environment, but its primary purpose is to structurally protect the steel safety enclosure against damage by external collision by aircraft.

The steel safety enclosure is maintained in an air tight condition but the interspace between it and the concrete enclosure is ventilated. Construction costs prevent the concrete shell from being made with inside dimensions large enough to form a substantial interspace, and the plant's auxiliary equipment which does not require containment by a steel safety enclosure is ordinarily housed in enclosures built out from the cylindrical wall of the concrete shell, necessarily for a substantial distance, reducing the mechanical strength which would be provided if the wall could be made as a continuous substantial unbroken cylinder. Such auxiliary equipment includes, for example, emergency reactor cooling and residual-heat removing facilities processing installations for the coolant and possibly other equipment requiring mechanical protection against external influences but not requiring air-tight enclosure within the steel safety enclosure sphere.

SUMMARY OF THE INVENTION

The objective of the present invention is to provide a construction of the type described and which provides an interspace between the walls of the two enclosures, having dimensions adequate to house the mentioned auxiliary equipment and without requiring any substantial enlargement of the concrete shell, thereby eliminating the need for extension constructions projecting from the cylindrical concrete wall.

According to this invention, the concrete enclosure is built around the steel safety enclosure so that the vertical axes of the two are horizontally offset from each other. In a typical installation the offsetting should be at least 0.5 meter. This displacement, on the side towards which the concrete construction is offset, provides an interspace enlargement. This enlarged interspace portion is defined on the outside by the cylindrical wall of the concrete shell and its upper hemispherical portion, so this space can extend vertically for a substantial distance and in which even the auxiliary equipment requiring a large vertical space may be housed without destroying the symmetry of the cylindrical wall. For such equipment the peripheral space enlargement effected by the present invention is adequate in the vertical direction.

The provisions of the interspace enlargement adequate to house the auxiliary equipment may require some enlargement of the normal diameter of the concrete protective shell, but such enlargement need not be so great as to make the concrete construction costs unrealistic.

The auxiliary equipment when housed within the cylindrical wall of the concrete shell is protected by the latter's great structure strength, this concrete construction being necessarily strongly reinforced. Such protection against external accidents, such as an aircraft collision, is important for the auxiliary equipment because it may also contain radiating material. Thus, the coolant may possibly be radiating, the coolant processing facility within the interspace being completely protected and this is effected without requiring localized enlargement or extensions formed as part of the shell structure, and necessarily altering its external symetry which is so desirable from the safety-engineering viewpoint.

The steel safety enclosure is provided with an air tight lock for the passage of materials and this lock necessarily projects from the steel sphere, and for its protection the offsetting of the concrete shell may be in the direction of this lock, even though the latter may be of substantial length, so that the latter is enclosed and protected by the great mechanical strength of the concrete wall of this shell. The concrete shell wall itself must have an opening for the outer end of this lock and this can be provided without destroying the concrete wall's outer symmetry. The wall is provided with an inwardly extending flange or edge surrounding this opening and providing reinforcement around the opening preventing any reduction in the shell wall's strength which might otherwise be caused by the opening. To provide maximum strength, the opening may be made circular or oval and initially be made with dimensions permitting passage of the largest of the components which must be installed within the steel safety enclosure. For example, during erection of the plant equipment, and prior to the installation of the lock in the steel safety enclosure, the reactor power plant components can be passed through the concrete wall, the opening at that time being large enough for the passage of even the reactor vessel itself, as well as pressure tanks, steam generators, and the like, the steel safety enclosure at that time, the lock not being installed, having an opening also large enough for the passage of such equipment. After installation, the steel safety enclosure opening is closed by steel plates and the steel lock, all being welded in place. After this, the large opening of the concrete shell may be reduced in size by the use of heavy plates providing a smaller opening of such dimensions as only required for the passage of materials through the lock to the interior of the steel containment vessel. These plates, which may be curved to follow the contour of the concrete wall, may be made of either reinforced concrete or steel, or a combination of both.

On the outside of the concrete wall at the opening the necessary elevator tower can be erected and by connection with the outside of the concrete wall, ridgedly supported. This tower may be provided with powerful lifting equipment for handling the heavy equipment during construction of the power plant, but thereafter replaced by less powerful lifting equipment for handling loads such as can be accommodated by the lock.

Steam generators enclosed by the steel safety enclosure producing steam from the reactor coolant heat, for power, have steam lines extending through the steel safety enclosure and the concrete shell to the outside, for example, to power a turbine. Because of the offsetting of the two structures, the interspace between the steel safety enclosure and the concrete shell is small on the side of the construction towards which the steel safety enclosure is offset from the concrete shell. These lines where they span the interspace between the two structures can be enclosed by jackets so that if these lines should rupture there is no chance that the steam, under the full pressure of the steam generators, can get into the interspace and possibly cause a collapse inwardly of the spherical steel safety enclosure.

A concrete foundation for the steel safety enclosure is provided by the concrete shell via a solid column extending upwardly from the shell's floor or base directly beneath the spherical steel containment vessel, but radially therefrom it is formed to provide various rooms or spaces having concrete partitions supporting the enclosure. Radially outwardly from these rooms an annular space is outwardly defined by the cylindrical wall of the concrete shell. This space may provide an upper clearance extending up to approximately one-half of the lower half of the spherical steel safety enclosure, thus providing substantial vertical clearance for equipment requiring this space. Thus it may be used to provide a loading station for the fuel elements which must be unloaded vertically from their containers, rotated to horizontal positions and fed through the steel safety enclosure which is provided with an opening just large enough to pass the fuel elements longitudinally, this arrangement being equipped with a small fuel element lock and with the loading station between the two structures provided with walls to provide water flooding.

DESCRIPTION OF THE DRAWINGS

The principles of this invention are illustrated by the accompanying drawings, in which:

FIG. 3 is a vertical section taken on the lines III—III in FIG. 2;

FIG. 4 is a vertical section showing the relationship between the spherical steel safety enclosure and its concrete protecting shell, this view eliminating details shown in the other views to simplify the understanding of the invention;

FIG. 7 is like FIG. 3 but shows a modification; and

FIG. 8 is a detail of parts of FIG. 7 showing a further modification.

DETAILED DESCRIPTION OF THE INVENTION

Figure 1:
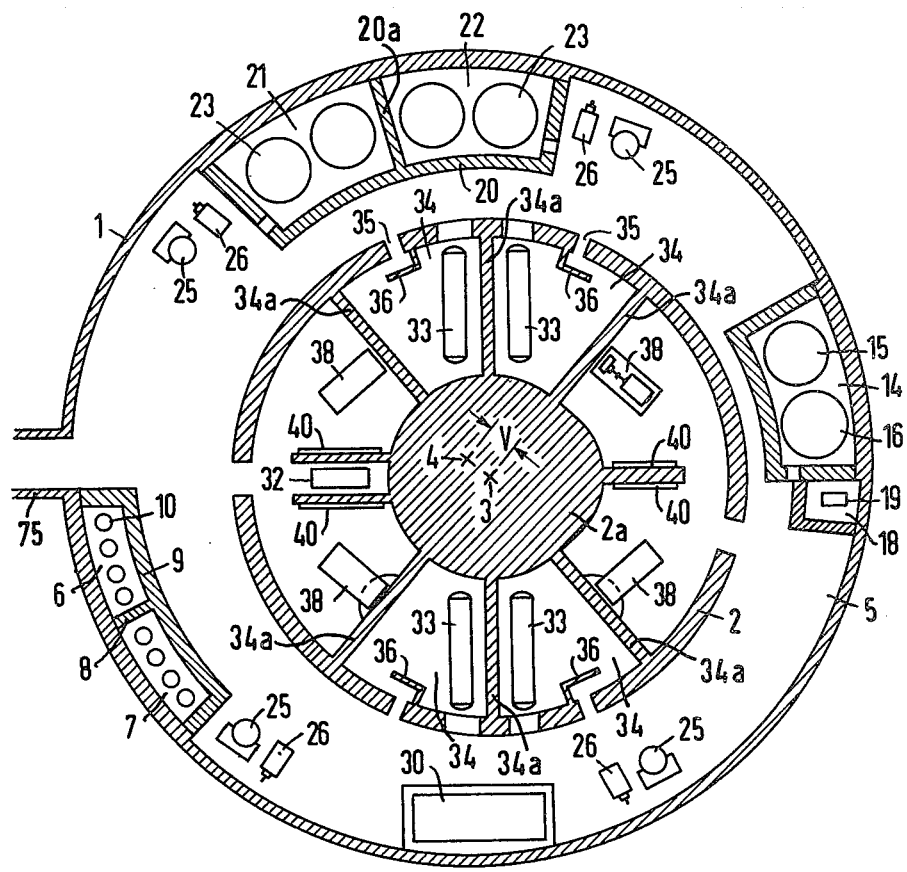
FIG. 1 is a cross section taken approximately on the line I—I in FIG. 4.

Referring first to FIG. 1, the lower level of concrete protective shell is formed with the vertical cylindrical wall 1 and a foundation for the steel safety enclosure (not shown in this view) and comprising a solid central column 2A and spaced radially therefrom an annular vertical supporting wall 2, all of which extend upwardly from the concrete base B closing the bottom of the concrete protective shell. The axis of this foundation construction comprising the parts 2 and 2A, must of course coincide with the vertical axis of the spherical steel safety enclosure, this axis being indicated at 3 although, as shown by FIG. 1, the axis of the outer cylindrical concrete wall 1, indicated at 4, is offset therefrom by the distance V, as previously described. In this instance the offset is approximately 4% of the outside diameter of the cylindrical wall 1 of the concrete structure, which usually has an outside dimension of 50 meters or more, the size of V therefore being 2 meters or more. The cylindrical wall of the concrete protective shell 1 extends upwardly so to form the hemispherical upper portion or top 1A which can be seen in FIG. 4. At the level shown by FIG. 1, between the concrete cylindrical walls 1 and 2 are located the auxiliary reactor facilities described below.

In the enlarged space formed by the offsetting, concrete walls define two rooms 6 and 7 of equal height separated by a concrete partition 8 from each other and by a concrete wall 9 from the annular space 5 between the two walls, and to which space personnel may have access via the reduced portion 12. Each room contains four identical tanks 10 which are vertically arranged and are part of a deceleration section of the usual exhaust gas decontamination system required for the usual reasons. The two groups of tanks which form the system, can be each run interchangeably.

On the opposite side, where the annular space is smaller, approximately opposite to the rooms 6 and 7, a room 14 is formed, again by concrete walls, containing two identical vertical tanks 15 and 16 in which boric acid and deionate can be stored, for addition, for example, to the reactor coolant. The small room 18 next to this room 14 contains the pump 19 and optionally the tank for the preparation of the boric acid solution, when required. These rooms 14 and 18 are also made of concrete walls which are integral with the concrete structure as a whole.

Circumferentially between the rooms 6-7 and 14, a concrete wall 20, part of the overall concrete structure, forms two equal size rooms 21 and 22 separated by a partition 20A and containing in each instance two identical tanks 23 for the storage of coolant for the reactor. The wall 20 is spaced radially from the wall 2 to leave the annular space 12 for the personnel with access to the space 5. Although the details are not shown, this coolant is provided for feeding to the pressurizer of the primary cooling circuit of the pressurized-water coolant reactor by means of a suitable pump.

It can be seen that the rooms 6, 7, 14, 21 and 22, each having the floor formed by the base B and ceilings formed by the shell's concrete supporting structure 2b for the spherical steel enclosure are surrounded by a thick concrete wall 2 on the inside and by the concrete shell wall 1, horizontally defining these rooms. This provides biological protection against radiation; the medium in these rooms may carry dangerous radiation. The rooms 6, 7, 21 and 22 have a height extending almost to the equator of the steel enclosure 55 as can be seen from FIG. 4.

The balance of the annular space 5 formed between the cylindrical concrete walls 1 and 2 is available to contain, among other equipment, intermedient coolers 25 and intermedient water-cooler pumps 26 of which four are equally interspaced in the annular space 5.

The annular space 5 around the rooms located at the level shown by FIG. 1, can be ventilated via an exhaust air duct 30 which extends upwardly to a system including activity-reducing filters (not shown) particularly for iodine.

As part of the auxiliary equipment for the reactor, within this foundation level including the central column 2A and surrounding wall 2, rooms 34 contain dehydration equipment 32 located between partitions 40, and also heat exchangers 33, each positioned in the rooms 34 defined by the concrete parts 2 and 2A and radial partition walls 34A, the rooms being arranged as pairs located diametrically opposite each other. These heat exchangers function as reactor coolant coolers, used to remove residual heat from the reactor during start-up and shut-down and being particular sources of radiation danger, the rooms 34 being equipped with shields 36 at the entrances 35 to these rooms. The reactor coolant may be circulated through these heat exchangers 33 by residual-heat cooling pumps 38 positioned on the other side of the partition 34A of the rooms 34.

Figure 2:
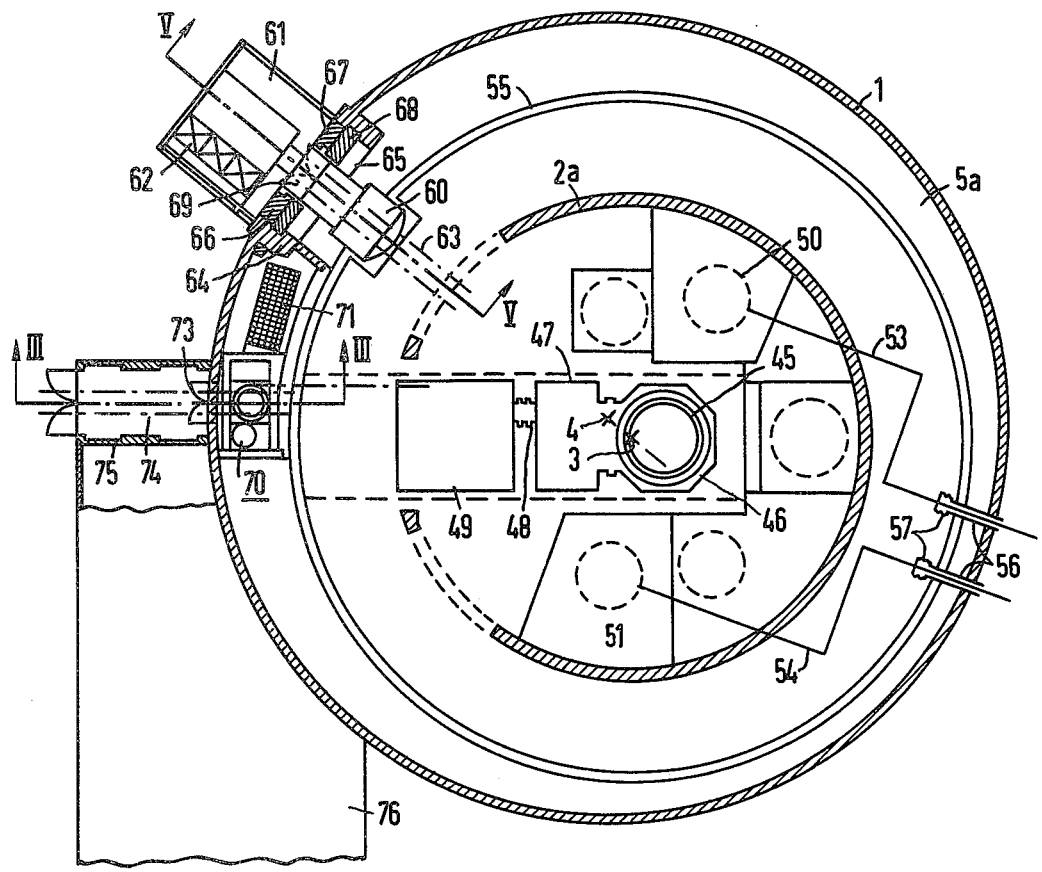
FIG. 2 is also a cross section but is taken at the next higher level.

In FIG. 2 the new construction is shown at a higher level wherein the upper annular space 5A is formed above the lower level of the foundation construction, and the various rooms illustrated by FIG. 1. At this upper level, the reactor pressure vessel 45 can be seen in the reactor pit 46 formed by the usual concrete biological shield and pressure confinement system, with the fuel element loading basin 47 in its usual position, into which fuel elements are fed from the usual fuel element storage basin 49 via a tubular passage 48 from the usual fuel element storage basin 49.

Steam generators 50 and 51 are arranged around the reactor pressure vessel 45 and from them extend the steam lines 53 and 54. The outline of the steel safety enclosure 55 can be seen in this FIG. 2, and the steam lines 53 and 54 pass through this enclosure and the concrete shell, via safety pipes or steam pressure confining casings 56 provided with connections 57 fastened to the steel enclosure 55 and providing for thermal movement accommodation. The steam lines in these pipes 56 extend through the portion of the construction having the smallest extent of the annular space 5A, permitting these pipes 56 and the steam lines to be made shorter than usually possible.

The lock 60 is shown welded to the wall of the steel safety vessel 55, positioned in alignment with the offsetting between 3 and 4 where the annular space 5A is of maximum size, this lock leading to an elevator tower 61 outside of the concrete shell structure 1. This elevator tower 61 mounts a traveling crane 62 for the components which must be lifted and passed through the lock. Carriage tracks 63 extend through the lock and lead to an opening 65 formed in the concrete shell 1. This opening, made of the concrete, is initially dimensioned to pass the largest components of the reactor installed during the erection of the plant, such as even the pressure vessel 45. After the installation is completed this opening 65 is reduced in size by means of a reinforced concrete plate 68, forming a hatch or opening 69, compatitable with the lock sized, which can be closed by two sliding doors 66 and 67, consisting of reinforced concrete in this instance. To prevent this large opening from forming a point of weakness in the concrete shell, this opening is framed by a peripheral flange 64 which in this instance extends inwardly for a substantial distance and defines shapes for receiving the plate 68 which reduces the size of the opening, and sliding runways for the doors 66 and 67.

FIG. 2 also shows the fuel element loading station 70 by means of which fuel elements can be brought through a relatively small fuel elements lock extending horizontally through the steel safety enclosure 55. With this loading station 70 is associated the new fuel elements storage basin 71 and a relatively small opening 73 in the concrete shell 1 which leads to a supporting rail connection 74 enclosed by a small ante-chamber 75. This ante-chamber many be connected with an auxiliary equipment building 76. These elements do not require the mechanical protection of the concrete structure 1. The small opening 73 may be crash-proofed as described hereinafter.

FIG. 3 illustrates the cylindrical concrete wall 1 extending up to the equator of the steel containment sphere 55 and the fuel element loading station 70 are provided with an outer construction 75 of adequate height, containing a traveling crane 81 running on transversely interspaced tracks 80 and by means of which fuel element containers running on tracks 74 located at ground level, can be lifted and handled. A carriage 82 runs on the tracks 74 and carries one of the vertical fuel element containers 83 from a supply on the outside to below and in registration with a vertical passage 84 which leads to the chamber 85 which can be flooded with water. Although not shown, the container is raised into water-tight connection with the passage 84, the chamber 85 is water-flooded and the fuel element removed from the container upwardly, through the water. The fuel element lifted from the container 83 is turned from a horizontal position in the chamber 85 so that it can be passed through the safety enclosure 55 via the horizontal fuel element lock 86. A traveling crane 89 runs on tracks 88 above the space 85 and serves for lifting the fuel element from the container 83.

The coolant tanks 23 referred to, when describing the parts shown in FIG. 1, are necessarily tall or vertically elongated to have the necessary capacity, and FIG. 4 illustrates how the rooms or compartments 21 and 22 provide adequate height for these tanks, being in the larger portion of the annular space, formed by the offsetting. Also, the room 14 for the boric acid and deionate, is shown, as well as the rooms or compartments 34 for the horizontal tanks 33 although the latter are not illustrated in FIG. 4. The concrete shell is shown with the hemispherical top 1a enclosing the upper half of the spherical steel enclosure 55, but this is above the concrete construction supporting this enclosure.

Figures 5, 6:
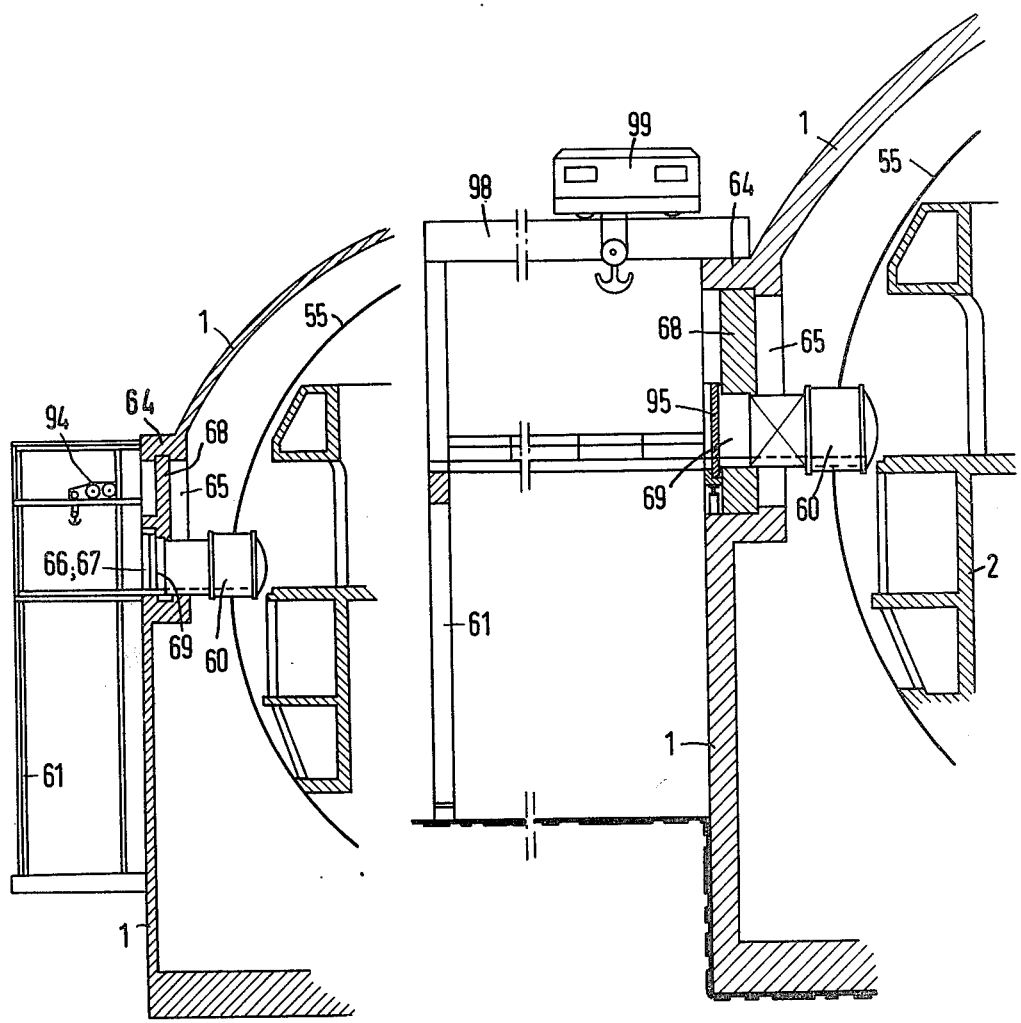
FIG. 5 is a vertical section taken on the line V—V in FIG. 2.
FIG. 6 corresponds to FIG. 5 but shows a modification.

In FIG. 5 the safety enclosure 55 with the materials lock 60 is shown, which leads to the opening 69 of the concrete shell 1. This also illustrates the shell reinforcement provided by the flange or thickened edge 64 so that the strength of the shell 1 is maintained, the flange being extended mainly outwardly in this case. The reinforced concrete sliding doors 66 and 67 are also illustrated. The elevator tower 61 is shown as provided with a traveling crane 94 for handling materials. The materials lock 60 may be of the usual length, it spanning the annular space between the shell 1 and safety enclosure 55.

FIG. 6 shows a modification of the FIG. 5 arrangement. In this instance the heavy trackway 98 for the heavy traveling crane 99 used during erection of the plant, to lift the heaviest loads such as the reactor vessel itself, have been left in location, although the reinforced concrete plate on wall 68 is shown as installed at the outer end of the lock 60 to reduce the size of the opening 65 required for the passage of such large parts during the erection and installation of the nuclear power plant inside of the steel safety enclosure 55. In this instance a very heavy steel door 95 is installed for normally closing the small opening required for access to the lock 60. Because of the weight lifted during erection of the plant, the trackway 98 is shown as having one end resting on the reinforced flange 64 which is in this instance shown as extending outwardly for a substantial distance. FIG. 5 shows the flange extending outwardly also, while in FIG. 2 the flange is shown as having its major parts extending inwardly.

The modification of FIG. 3, illustrated by FIG. 7, comprises a tunnel 103 strongly made of reinforced concrete and providing a passage 104 leading to and from the loading room 105. Although not shown, tracks may run through this tunnel on which the fuel element carriage 82 may travel from the loading room 105 to the outer construction 106 that corresponds in general to the outer construction 75 shown by FIG. 3. This tunnel 105 prevents damage to the steel safety enclosure 55 in the event of an external collision such as might occur if an aircraft crashes into the installation.

FIG. 8 shows a modification of the loading station in which the loading room is made with thick reinforced concrete walls and the access to this loading room 105 is closed by a shock proof door 110. This door 110 also provides a biological shield, being closed when the elements are lifted from the fuel element container 83.

What is claimed is:

1. A nuclear reactor installation comprising a spherical steel enclosure, pressure-carrying components at least comprising a pressurized-coolant reactor pressure vessel having a pressurized-coolant pump and a pressurized-coolant heat-exchanger, said components being contained inside of said enclosure and the enclosure being air-tight and functioning to intercept pressurized-coolant accidentally released by any of said components, a concrete construction entirely enclosing said spherical steel enclosure and forming an upstanding cylindrical wall extending upwardly to at least the equator of the spherical steel enclosure and a top over the spherical steel enclosure, said upstanding cylindrical wall forming an annular space extending completely around said spherical steel enclosure and which is accessible to personnel during operation of said components, the vertical axis of said cylindrical wall being horizontally offset from the vertical axis of said spherical steel enclosure to form an enlarged area in said space in the direction of said offset, and means for ventilating said space.

2. The installation of claim 1 in which said spherical steel enclosure has an air-tight materials' lock projecting therefrom into a portion of said enlarged area of said annular space but remaining entirely inside of said cylindrical wall of said concrete construction, said cylindrical wall having an opening for access to said lock and having a closure for said opening, said wall of said concrete construction and said closure protecting said lock against externally caused damage.

3. The installation of claim 1 in which a steam line extends from said steam generator air-tightly through said spherical steel enclosure and through said cylindrical wall of said concrete construction, in a direction opposite to said offset and in which direction said annular space has a reduced area because of said offset and which is spanned by said steam line.

4. The installation of claim 3 in which said steam line is enclosed by a steam line rupture protection jacket which extends from said spherical steel enclosure to said cylindrical wall of said concrete construction.

5. The installation of claim 1 in which a portion of said enlarged area of said annular space, forms a fuel element loading station inside of said cylindrical wall of said concrete construction, said spherical steel enclosure having a fuel element lock extending horizontally therethrough for the endwise passage of fuel elements to said loading station, and said loading station having means for rotating fuel elements between vertical and horizontal positions.

6. The installation of claim 5 in which an opening for said loading station is formed through said cylindrical wall, and said opening has means for protecting said loading station against externally caused damages.

7. The installation of claim 1 in which said concrete construction forms in said enlarged area of said annular space, at least one room with a concrete wall spaced from said spherical steel enclosure so as to leave a portion of said annular space accessible to personnel, said room containing material which is possibly radioactive.

* * * * *